United States Patent
Casteren Van et al.

(10) Patent No.: US 8,088,493 B2
(45) Date of Patent: *Jan. 3, 2012

(54) LOW NWP AQUEOUS POLYURETHANE COMPOSITION

(75) Inventors: Ilse Casteren Van, Waalwijk (NL); Marc Roelands, Waalwijk (NL); Gerardus Cornelis Overbeek, Waalwijk (NL); Ronald Tennebroek, Waalwijk (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,903

(22) Filed: Nov. 10, 2010

(65) Prior Publication Data

US 2011/0064956 A1    Mar. 17, 2011

Related U.S. Application Data

(62) Division of application No. 11/630,367, filed as application No. PCT/EP2005/006934 on Jun. 28, 2005, now Pat. No. 7,976,953.

(30) Foreign Application Priority Data

Jun. 30, 2004 (GB) .................................... 414598.3

(51) Int. Cl.
*B32B 27/40* (2006.01)
*C08G 18/02* (2006.01)
*B05D 3/02* (2006.01)

(52) U.S. Cl. ............... 428/423.1; 428/425.1; 428/425.5; 428/425.6; 428/425.8; 106/287; 524/840; 528/73; 427/385.5

(58) Field of Classification Search ............... 428/423.1, 428/425.1, 425.5, 425.6, 425.8; 524/840; 528/73; 106/287; 427/385.5
See application file for complete search history.

(56) References Cited

U.S. PATENT DOCUMENTS

| 4,927,876 | A | 5/1990 | Coogan et al. |
| 4,983,662 | A | 1/1991 | Overbeek et al. |
| 5,169,895 | A | 12/1992 | Coogan et al. |
| 6,432,544 | B1 | 8/2002 | Stewart et al. |
| 7,569,636 | B2 | 8/2009 | Tennebroek et al. |
| 7,683,139 | B2 | 3/2010 | Van Casteren et al. |
| 2008/0038563 | A1 | 2/2008 | Van Casteren et al. |

FOREIGN PATENT DOCUMENTS

| EP | 0 663 412 | 7/1995 |
| EP | 0 841 357 | 5/1998 |
| WO | WO 91/17196 | 11/1991 |
| WO | WO 95/00570 | 1/1995 |

OTHER PUBLICATIONS

International Search Report.

*Primary Examiner* — Thao T. Tran
(74) *Attorney, Agent, or Firm* — Nixon & Vanderhye P.C.

(57) ABSTRACT

An aqueous composition with a sediment content ≦5%, comprising a polyurethane dispersion wherein the polyurethane has an acid value in the range of from 25 to 65 mgKOH/g and comprises (i) 36 to 60 wt % of at least one aromatic polyisocyanate and where the polyurethane is prepared in the presence of (a) ≦5 wt % of 1-methyl-2-pyrrolidinone by weight of the polyurethane, (b) 5 to 100 wt % of 1-ethyl-2-pyrrolidinone by weight of polyurethane and (c) water.

21 Claims, No Drawings

LOW NWP AQUEOUS POLYURETHANE COMPOSITION

This application is a divisional of commonly owned U.S. application Ser. No. 11/630,367, filed Feb. 1, 2007 now U.S. Pat. No. 7,976,953, which is the national phase application under 35 USC §371 of PCT/EP2005/006934, filed Jun. 28, 2005 which designated the US and claims benefit of GB 0414598.3, filed Jun. 30, 2004, the entire contents of each of which are hereby incorporated by reference.

The present invention relates to an aqueous composition comprising a polyurethane dispersion, an aqueous composition comprising a polyurethane vinyl hybrid dispersion, a process for making the aqueous compositions and the use of such aqueous compositions in coatings, such as coatings for floors.

It is well known in the coatings industry that polyurethane dispersions can be applied to a variety of substrates to provide coatings with good resistance to abrasion, good chemical resistance, good flexibility and durability as well as having good adhesion to the substrate. A major application for such coatings is as clear coatings for wood flooring.

Conventionally polyurethane compositions are prepared in organic solvents which evaporate on drying after application to a substrate. For reasons of environmental protection and adherence to solvent emission guidelines water-based polyurethane dispersions and polyurethane vinyl hybrid dispersions have been developed and are well known.

It is also known that polyurethanes based predominantly on aromatic polyisocyanates have better hardness, better resistance against chemicals and better mechanical properties in for example flooring applications than polyurethanes based predominantly on aliphatic isocyanates. Furthermore the use of aromatic polyisocyanates tends to be more cost effective than the use of aliphatic polyisocyanates.

U.S. Pat. No. 4,801,644 and U.S. Pat. No. 4,927,876 disclose the preparation of aqueous polyurethane compositions containing diphenylmethane-2,4-diisocyanate utilising 1-methyl-2-pyrrolidinone as an organic solvent.

U.S. Pat. No. 5,173,526 discloses a method for making aqueous polyurethane-vinyl polymer dispersions with 1-methyl-2-pyrrolidinone being used as a solvent.

U.S. Pat. No. 5,314,942 discloses an aqueous polymer dispersion containing a vinyl polymer prepared in-situ and a water-dispersible polyurethane having pendent polyethylene oxide chains and utilising 1-methyl-2-pyrrolidinone.

U.S. Pat. No. 6,239,209 discloses an air-curable polyurethane-acrylic hybrid interpenetrating polymer network.

U.S. Pat. No. 6,566,438 discloses aliphatic polyurethane vinyl hybrid compositions containing 1-methyl-2-pyrrolidinone.

JP 06-08553 and JP 03-193446 disclose the preparation of polyurethane-polyurea dispersions.

However such water-based polyurethanes and polyurethane vinyl hybrids, especially if based on aromatic polyisocyanates, still utilise significant amounts of 1-methyl-2-pyrrolidinone (NMP) to reduce the viscosity during production, which remains in the aqueous composition after dispersion of the polyurethane in water and then evaporates on drying.

Proposed changes in future legislation from irritant to toxic on the labelling of products containing NMP are resulting in increased efforts to minimise and even eliminate the use of NMP altogether. Therefore there is a need for a replacement diluent for NMP which has a more acceptable toxicological profile.

A disadvantage resulting from the preparation of polyurethanes based on aromatic isocyanates and with very low NMP levels or with no NMP at all is that the processing usually results in a high level of sediment and/or gel.

U.S. Pat. No. 4,318,833 discloses water-reducible acrylic-urethane coating compositions where the polyurethanes are prepared in a solvent mixture.

U.S. Pat. No. 4,644,030 discloses aqueous polyurethane-polyolefin compositions.

U.S. Pat. No. 5,137,961 discloses the preparation of a surfactant free aqueous polymer dispersion containing an anionic polyurethane based substantially on aliphatic isocyanates and a vinyl polymer where vinyl monomers are used to reduce the viscosity of the reaction mixture.

U.S. Pat. No. 6,635,706 discloses a pre-crosslinked urethane-acrylic dispersion.

U.S. Pat. No. 6,635,723 discloses a process for making a solvent-free polyurethane dispersion using a relatively low aliphatic polyisocyanate content.

U.S. Pat. No. 6,720,385 discloses aqueous polyurethane latexes prepared without the use of organic solvents using relatively high levels of polyethylene oxide polyols.

JP 09-150568, JP 09-150569, JP 09-102861 and JP 09-038674 disclose the preparation of aqueous polyurethane compositions utilizing unsaturated monomers and hydroxyl groups bearing organic solvents.

U.S. Pat. No. 3,705,164, U.S. Pat. No. 4,066,591, U.S. Pat. No. 6,538,046, U.S. Pat. No. 5,662,966 and U.S. Pat. No. 5,637,639 all teach the preparation of polyurethane by making a prepolymer in solvent such as acetone followed by dispersion in water, chain extension of the prepolymer and removal of the solvent. Removal of solvent tends to be laborious and costly and there is also an associated risk of fire.

Furthermore in the prior art there is a desire to keep the level of polyisocyanate used in the polyurethane preparation to a minimum in order to get acceptable processing.

Therefore, in compositions with a high aromatic isocyanate content and a low NCO/OH ratio (which result in relatively high molecular weight isocyanate-terminated prepolymers with a high viscosity and which are difficult to process) it is necessary to use a suitable diluent to control viscosity and to facilitate the dispersing process. The problem to solve is to replace NMP with a toxicologically more acceptable solvent during the synthesis of polyurethanes with a high aromatic isocyanate content, while maintaining the good processing and final properties that can be obtained when using NMP.

A suitable diluent should comply with a number of requirements. Since the diluent will be used in the isocyanate-terminated prepolymer preparation, it should not contain any isocyanate-reactive groups. Since the diluent will also be present during any chain extension with diamines and hydrazine compounds, the diluent should also not be reactive with commonly used chain extenders such as ethylene diamine and hydrazine.

Dimethylolpropionic acid (DMPA) is the most commonly used acid functional diol to incorporate water dispersibility into the polyurethane and therefore the diluent should also be a good solvent for DMPA. Preferably it should be possible to prepare a 30 wt % solution of DMPA in this diluent. Furthermore to promote a good water dispersibility of the isocyanate-terminated prepolymer, the diluent should be miscible with water.

The viscosity of the diluent at 25° C. should be <6 mPas and more preferably <4 mPas, in order to have a good diluting effect.

For handling purposes (such as transport and storage) in any weather conditions, the diluent should have a freezing point <−20° C.

To support film formation after application of the composition to a substrate the diluent should preferably have a boiling point >160° C. and more preferably >200° C. If a diluent with a lower boiling point is used the diluent may evaporate from the film before sufficient film formation has taken place, thus leading to a reduced level of chemical and water resistance. Within a typical production environment, only diluents with a minimal flashpoint are usually allowable. The preferred flash point of the diluent is >75° C., more preferably >85° C.

Alternatives to NMP have been reviewed in the art, for example dimethylformamide can be used, however dimethylformamide has an unfavourable toxicological profile and a low flash point. Dimethyl acetamide and diethylene glycol dimethyl ether have an unacceptable toxicological profile. Tetramethylurea has a melting point of −1° C. which can cause problems in cold conditions. Dimethylsulphoxide also has an unacceptably high melting point of 18.5° C. and has an unsuitable garlic odour. Sulpholane has a melting point of 27.5° C. which would require heating of the solvent before use and also has a strong odour due to impurities. Aromatic diluents such as toluene and xylene may hamper water dispersibility of the polyurethane due to their poor miscibility with water. Polyurethane dispersions prepared with butyrolactone appear to be instable and the lactone group is also able to react with chain extenders such as hydrazine and ethylene diamine. Methylethylketone has a flashpoint of −4° C. and a strong odour.

We have now found that it is possible to prepare polyurethanes with a high level of aromatic polyisocyanate content as well as a low NMP content and polyurethane vinyl hybrids with a low NMP content and yet maintain good processability with low levels of sediment to give dispersions that may form hard and resistant coatings using 1-ethyl-2-pyrrolidinone as a diluent.

According to the present invention there is provided an aqueous composition with a sediment content ≦5%, comprising a polyurethane dispersion and containing ≦5 wt % of 1-methyl-2-pyrrolidinone by weight of the polyurethane, wherein the polyurethane has an acid value in the range of from 24 to 65 mgKOH/g and is obtained by the reaction of:
A) an isocyanate-terminated prepolymer formed from components comprising:
  (i) 30 to 60 wt % of at least one aromatic polyisocyanate;
  (ii) 0 to 30 wt % of at least one aliphatic polyisocyanate;
  (iii) 0 to 15 wt % of at least one isocyanate-reactive polyol bearing ionic and/or potentially ionic water-dispersing groups with a weight average molecular weight ≦500 g/mol;
  (iv) 0 to 10 wt % of at least one isocyanate-reactive polyol bearing non-ionic water-dispersing groups;
  (v) 0 to 15 wt % of at least one isocyanate-reactive polyol with a weight average molecular weight ≦500 g/mol not comprised by (iii) or (iv);
  (vi) 20 to 58 wt % of at least one isocyanate-reactive polyol not comprised by (iii), (iv) or (v);
  where (i)+(ii)+(iii)+(iv)+(v)+(vi) add up to 100 wt %;
  where the NCO/OH ratio is in the range of from 1.2:1 to 2.5:1; and
B) at least one active-hydrogen chain extending compound;
  where the active hydrogen/NCO ratio is in the range of from 0.4:1 to 1.3:1;
in the presence of (a) ≦5 wt % of 1-methyl-2-pyrrolidinone by weight of polyurethane, (b) 5 to 100 wt % of 1-ethyl-2-pyrrolidinone by weight of polyurethane and (c) water.

Preferably the aqueous composition comprising a polyurethane dispersion contains ≦3 wt %, more preferably ≦1 wt % and most preferably 0 wt % of NMP by weight of the polyurethane.

For clarity by weight of polyurethane is meant the weight of polyurethane solids.

According to a second embodiment of the present invention there is provided an aqueous composition with a sediment content ≦5%, comprising a polyurethane vinyl hybrid dispersion and containing ≦0.5 wt % of 1-methyl-2-pyrrolidinone by weight of the composition;
wherein the polyurethane has an acid value in the range of from 24 to 65 mgKOH/g and is obtained by the reaction of:
A) an isocyanate-terminated prepolymer formed from components comprising:
  (i) 30 to 60 wt % of at least one aromatic polyisocyanate;
  (ii) 0 to 30 wt % of at least one aliphatic polyisocyanate;
  (iii) 0 to 15 wt % of at least one isocyanate-reactive polyol bearing ionic and/or potentially ionic water-dispersing groups with a weight average molecular weight ≦500 g/mol;
  (iv) 0 to 10 wt % of at least one isocyanate-reactive polyol bearing non-ionic water-dispersing groups;
  (v) 0 to 15 wt % of at least one isocyanate-reactive polyol with a weight average molecular weight ≦500 g/mol not comprised by (iii) or (iv);
  (vi) 20 to 58 wt % of at least one isocyanate-reactive polyol not comprised by (iii), (iv) or (v);
  where (i)+(ii)+(iii)+(iv)+(v)+(vi) add up to 100 wt %;
  where the NCO/OH ratio is in the range of from 1.2:1 to 2.5:1; and
B) at least one active-hydrogen chain extending compound;
  where the active hydrogen/NCO ratio is in the range of from 0.4:1 to 1.3:1;
in the presence of (a) ≦5 wt % of 1-methyl-2-pyrrolidinone by weight of polyurethane, (b) 5 to 100 wt % of 1-ethyl-2-pyrrolidinone by weight of polyurethane and (c) water.

Preferably components (i)+(ii)+(iii)+(v) add up to ≧42 wt %, more preferably ≧50 wt % and especially ≧55 wt %.

1-Ethyl-2-pyrrolidinone (NEP) is added as a diluent before and/or during and/or after the isocyanate-terminated prepolymer formation to control the viscosity. Preferably the NEP is present during the formation of the isocyanate-terminated prepolymer.

Preferably 10 to 60 wt % and more preferably 10 to 35 wt % of 1-ethyl-2-pyrrolidinone by weight of polyurethane is used.

By a polyurethane vinyl hybrid is meant that a vinyl polymer is prepared by the polymerisation of unsaturated vinyl monomers in the presence of the polyurethane. The vinyl polymer may be grafted to the polyurethane or alternatively the vinyl polymer is not grafted to the polyurethane during the polymerisation.

Preferably the ratio of polyurethane to vinyl polymer in the polyurethane vinyl hybrid is in the range of from 95:5 to 30:70, more preferably 85:15 to 35:65 and most preferably 75:25 to 40:60.

Preferably the acid value of the polyurethane is in the range of from 25 to 55 mgKOH/g and more preferably 25 to 45 mgKOH/g of polyurethane.

For clarity the terms polyurethane, vinyl polymer, vinyl monomer and polyurethane vinyl hybrid are intended to cover the singular as well as the plural.

The aromatic polyisocyanate component (i) can be a mixture of organic polyisocyanates. This term (for the sake of clarity) being intended to mean compounds in which all of the isocyanate groups are directly bonded to an aromatic group, irrespective of whether aliphatic groups are also present. Examples of suitable aromatic polyisocyanates include but are not limited to p-xylylene diisocyanate, 1,4-phenylene diisocyanate, 2,4-toluene diisocyanate, 2,6-toluene diisocyanate, 4,4'-methylene bis(phenyl isocyanate), polymethylene polyphenyl polyisocyanates, 2,4'-methylene bis(phenyl isocyanate) and 1,5-naphthylene diisocyanate.

Preferably the isocyanate-terminated prepolymer comprises 30 to 60 wt %, more preferably 30 to 55 wt %, most preferably 30 to 55 wt % and especially 36 to 55 wt % of component (i).

Preferably component (i) comprises methylene bis(phenyl isocyanate) (all isomers) and/or toluene diisocyanate (all isomers). More preferably component (i) comprises 10 to 70 wt % of toluene diisocyanate and from 90 to 30 wt % of methylene bis(phenyl isocyanate). Even more preferably component (i) comprises from 25 to 60 wt % of toluene diisocyanate and from 75 to 40 wt % of methylene bis(phenyl isocyanate) where preferably the methylene bis(phenyl isocyanate) is a mixture of 4,4'- and 2,4'-methylene bis(phenyl isocyanate) where preferably the mixture contains from 5 to 70 wt % of 2,4'-methylene bis(phenyl isocyanate).

The aliphatic polyisocyanate component (ii) can be a mixture of aliphatic isocyanates. This term (for the sake of clarity) being intended to mean compounds in which all of the isocyanate groups are directly bonded to aliphatic or cycloaliphatic groups, irrespective of whether aromatic groups are also present.

Examples include but are not limited to ethylene diisocyanate, para-tetra methylxylene diisocyanate (p-TMXDI), meta-tetra methylxylene diisocyanate (m-TMXDI), 1,6-hexamethylene diisocyanate, isophorone diisocyanate, cyclohexane-1,4-diisocyanate, and 4,4'-dicyclohexylmethane diisocyanate. Preferably component (ii) comprises isophorone diisocyanate and 4,4'-dicyclohexylmethane diisocyanate.

Preferably the isocyanate-terminated prepolymer comprises 0 to 12 wt %, more preferably 0 wt % of component (ii).

Preferably at least 70 wt %, more preferably at least 85 wt % and most preferably at least 95 wt % of the polyisocyanates in components (i) and (ii) have two isocyanate groups.

Aromatic or aliphatic polyisocyanates which have been modified by the introduction of urethane, allophanate, urea, biuret, uretonimine, urethdione or isocyanurate residues can be used for components (i) and (ii) respectively.

The isocyanate-reactive components (iii) to (vi) will normally consist of a polyol component bearing isocyanate-reactive groups which may also bear other reactive groups. By a polyol component it is also meant to include compounds with one or more isocyanate-reactive groups such as —OH, —SH, —NH— and —NH$_2$.

Water-dispersing groups are preferably introduced by employing at least one isocyanate-reactive compound (or less preferably an isocyanate-functional compound) bearing a non-ionic and/or ionic water-dispersing groups as a component in the preparation of the isocyanate-terminated prepolymer. Preferably component (iii) comprises anionic or potentially anionic water-dispersing groups. Examples of compounds bearing anionic water-dispersing groups include phosphoric acid groups, sulphonic acid groups and/or carboxylic acid groups such as carboxyl group containing diols and triols. Preferably component (iii) comprises dihydroxy alkanoic acids such as 2,2-dimethylolpropionic acid (DMPA) and/or 2,2-dimethylolbutanoic acid (DMBA).

The anionic water-dispersing groups are preferably fully or partially in the form of a salt. Conversion of for example a potentially anionic water-dispersing group to the salt form (i.e. anionic water-dispersing group) may be effected by neutralisation with a base, preferably during the preparation of the aqueous composition of the present invention.

If the anionic water-dispersing groups are neutralised, the base used to neutralize the groups may be selected from ammonia, an amine, an inorganic base and combinations thereof. Preferably ammonia and inorganic bases are only used in combination with other neutralizing agents, where generally less than 0.5 equivalent, more preferably less than 0.2 equivalent of ammonia and/or inorganic base per carboxylic acid group is used. Tertiary amines are preferred. Tertiary amines include for example triethylamine, dimethyl amino ethyl methacrylate or oxygen containing amines. Preferably ≧60 wt %, more preferably ≧80 wt % and especially 100 wt % of the polyurethane is neutralised with an oxygen containing amine.

Preferably the oxygen containing amine is selected from the group consisting of N-ethyl morpholine; N-methyl morpholine; and R$^1$(R$^2$)NR$^3$OH with a Mn in the range of from 88 to 118, where R, R$_2$ and R$_3$ are each independently C$_1$ to C$_4$-alkyl (for example dimethyl isopropanol amine); and more preferably the oxygen containing amine is N,N-dimethylethanolamine. Suitable inorganic bases include alkali hydroxides and carbonates, for example lithium hydroxide, sodium hydroxide or potassium hydroxide. A quaternary ammonium hydroxide, for example N$^+$(CH$_3$)$_4$(OH), can also be used. Generally a base is used which gives counter ions that may be desired for the composition. For example, preferred counter ions include Li$^+$, Na$^+$, K$^+$, NH$^+$, and substituted ammonium salts. When inorganic bases are used they are preferably used in combination with at least one tertiary amine as described above.

Neutralisation is usually based on the equivalent of ionic groups, and preferably the ionic water-dispersing groups in the isocyanate-terminated prepolymer are neutralised with a neutralizing agent in the range of from 0.5:1 to 1.4:1, more preferably 0.6:1 to 1.4:1, most preferably 0.75:1 to 1.30:1 and especially 0.95:1 to 1.25:1. At lower levels not enough of the prepolymer is dispersed leading to an increase in sediment levels and at higher levels an increase in pH may occur, resulting in more isocyanate groups reacting with water. This results in an increase in foam and a reduction in the molecular weight of the polyurethane. Additionally at higher levels a discoloration of the resultant coating or substrate may occur especially when applied to certain types of wood such as oak.

Cationic water-dispersible groups can also be used, but are less preferred. Examples include pyridine groups, imidazole groups and/or quaternary ammonium groups which may be neutralised or permanently ionised (for example with dimethylsulphate).

Preferably the isocyanate-terminated prepolymer comprises 5.0 to 12.0 wt % and more preferably 6.0 to 10.0 wt % of component (iii).

Component (iv) bears non-ionic water-dispersing groups. Preferred non-ionic water-dispersing groups are polyalkylene oxide groups where ethylene oxide is the major component. A small part of the polyethylene oxide segments can be replaced by propylene oxide segments and/or butylene oxide segments, however the polyalkylene oxide group should still contain ethylene oxide as a major component. Most preferably the non-ionic water-dispersing group comprises at least 90 wt %, more preferably at least 95 wt %, especially at least 98 wt % and most especially 100 wt % of ethylene oxide. When the water-dispersible group is polyethylene oxide, preferably the polyethylene oxide group has a molecular weight from 175 to 5000 Daltons, more preferably from 350 to 2200 Daltons, most preferably from 660 to 1600 Daltons.

Examples of preferred compounds bearing non-ionic water-dispersing groups include methoxy polyethylene glycol (MPEG) with molecular weights of for example 350, 550, 750, 1000 and 2000, as described in EP 0317258.

An excess of isocyanate-reactive polyols bearing non-ionic water-dispersing groups may result in lower König Hardness and lower chemical or stain resistance of the resultant coating. Preferably the isocyanate-terminated prepolymer comprises 0 to 7 wt %, more preferably 0 wt % of component (iv).

Examples of component (v) include but are not limited to ethylene glycol, neopentyl glycol and 1,4-cyclohexyldimethanol and less preferably water. Also included are low molecular weight polyester polyols which include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or mixtures thereof, with polycarboxylic acids, especially dicarboxylic acids or their ester-forming derivatives, for examples succinic, glutaric and adipic acids or their methyl esters, phthalic anhydrides or dimethyl terephthalate. Polyesters obtained by the polymerisation of lactones, for example caprolactone in conjunction with a polyol may also be used.

Preferably component (v) has an average of 1.8 to 2.5 isocyanate-reactive groups and more preferably component (v) has two hydroxy functional groups.

Preferably the weight average molecular weight of component (v) is in the range of from 62 to 300 and more preferably 84 to 200 g/mol.

Preferably the isocyanate terminated prepolymer comprises 2 to 8 wt % and more preferably 3 to 6 wt % of component (v).

Examples of component (vi) include but are not limited to higher molecular weight examples of the compounds listed for component (v) such as polyesters, polyether polyols polyesteramides, polythioethers, polycarbonates, polyacetals, polyolefins and polysiloxanes.

Polyesteramides may be obtained by the inclusion of amino-alcohols such as ethanolamine in polyesterification mixtures. Polyesters which incorporate carboxy groups may be used, for example polyesters where DMPA and/or DMBA is used during the synthesis, provided that the esterification is carried out under conditions which allow the retention of the carboxy functionality in the final polyester.

A feature of such carboxy functional polyesters is that they can contribute to the dispersibility of the isocyanate-terminated prepolymer in water, thus allowing a lower level of component (iii) to be used.

Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylpropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Particular preferred are polyester diols.

Components (v) and (vi) may also include crosslinking groups. Crosslinking groups are well known in the art and include groups which may crosslink at ambient temperature (20±3° C.) by a number of mechanisms including but not limited to autoxidation (for example by fatty acid groups containing unsaturated bonds); Schiff base crosslinking (for example the reaction of carbonyl functional groups with carbonyl reactive amine and/or hydrazine functional groups); silane crosslinking (for example the reaction of alkoxy silane groups in the presence of water) and epoxy groups crosslinking with epoxy-reactive functional groups.

When an isocyanate-terminated prepolymer is prepared, it is conventionally formed by reacting a stoichiometric excess of the organic polyisocyanate (components (i) and (ii)) with the isocyanate-reactive compounds (components (iii), (iv), (v) and (vi)) under substantially anhydrous conditions at a temperature between about 30° C. and about 130° C. until reaction between the isocyanate groups and the isocyanate-reactive groups is substantially complete; preferably the reactants for the prepolymer are generally used in proportions corresponding to a ratio of isocyanate groups to isocyanate-reactive groups of from about 1.4:1 to about 2.0:1 and more preferably from about 1.45:1 to 1.75:1.

Preferably the practical NCO % of the prepolymer at the end of prepolymer preparation should be equal to or less than the theoretical NCO %. If the practical NCO % is greater than the theoretical NCO %, then the prepolymer reaction has not been completed which will affect the reproducibility of the dispersion ability since the amount of residual free polyols and/or isocyanates may vary. Additionally, if the prepolymer reaction has not been completed and dispersion is started the dispersability will be decreased as any unreacted polyols and free isocyanates reduce the water up take and will therefore result in more sediment.

If desired, catalysts such as dibutyltin dilaurate and stannous octoate, zirconium or titanium based catalysts may be used to assist the polyurethane formation. Preferably no catalyst is used.

Active hydrogen-containing chain extending compounds, which may be reacted with the isocyanate-terminated prepolymer include amino-alcohols, primary or secondary diamines or polyamines, hydrazine and substituted hydrazines.

Examples of such chain extending compounds useful herein include alkylene diamines such as ethylene diamine and cyclic amines such as isophorone diamine. Also compounds such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid dihydrazide, oxalic acid dihydrazide, isophthalic acid dihydrazide, hydrazides made by reacting lactones with hydrazine, bis-semi-carbazide, and bis-hydrazide carbonic esters of glycols may be useful. Water itself may be effective as an indirect chain extending compound. Another suitable class of chain extending compounds are the so-called "Jeffamine" compounds with a functionality of 2 or 3 (available from Huntsman). These are PPO or PEO-based di or tri-amines, e.g. "Jeffamine" T403 and "Jeffamine" D-400.

Preferably the amount of active-hydrogen chain extending compound other than water to isocyanate (NCO) groups is in the range of from 0.5:1 to 1.2:1, more preferably 0.6:1 to 1.1:1, especially 0.75:1 to 1.02:1 and most preferably 0.78:1 to 0.98:1.

Where the chain extender is other than water, for example a polyamine or hydrazine, it may be added to an aqueous dispersion of the isocyanate-terminated prepolymer or preferably, it may already be present in the aqueous medium when the isocyanate-terminated prepolymer is dispersed therein.

The isocyanate-terminated prepolymer may be dispersed in water using techniques well known in the art.

Preferably, the isocyanate-terminated prepolymer is added to the water with agitation or, alternatively, water may be stirred into the isocyanate-terminated prepolymer.

Vinyl monomers as described below may also be added to the aqueous phase before and/or during and/or after dispersing the isocyanate-terminated prepolymer in water. The function of these vinyl monomers is not primarily as a diluent to control the viscosity of the isocyanate-terminated prepolymer formation but to contribute to the in-situ preparation of a vinyl polymer although they may of course inherently contribute to the overall viscosity.

All of the vinyl monomer may be present before commencement of polymerisation, or the vinyl monomer may be added to the reaction medium during the course of the polymerisation (in one or more stages or continuously). For example, when the aqueous dispersion of the isocyanate-terminated prepolymer is formed in the process to make the polyurethane as described above, some or all of the vinyl monomer may be added before and/or after and/or during the isocyanate-terminated prepolymer preparation prior to its dispersion into water or all of the vinyl monomer may be added subsequent to the dispersion (or some or all of the vinyl monomer may have already been added to the water prior to the dispersion of the isocyanate-terminated prepolymer therein).

Examples of such vinyl monomers include but are not limited to vinyl monomers such as 1,3-butadiene, isoprene; trifluoro ethyl (meth)acrylate (TFEMA); dimethyl amino ethyl (meth)acrylate (DMAEMA); styrene, α-methyl styrene, (meth)acrylic amides and (meth)acrylonitrile; vinyl halides such as vinyl chloride; vinylidene halides such as vinylidene chloride; vinyl ethers; vinyl esters such as vinyl acetate, vinyl propionate, vinyl laurate; vinyl esters of versatic acid such as VeoVa 9 and VeoVa 10 (VeoVa is a trademark of Resolution); heterocyclic vinyl compounds; alkyl esters of mono-olefinically unsaturated dicarboxylic acids such as di-n-butyl maleate and di-n-butyl fumarate and in particular, esters of acrylic acid and methacrylic acid of formula $CH_2=CR^1-COOR^2$ wherein $R^1$ is H or methyl and $R^2$ is optionally substituted alkyl or cycloalkyl of 1 to 20 carbon atoms (more preferably 1 to 8 carbon atoms) examples of which are methyl (meth)acrylate, ethyl (meth)acrylate, butyl (meth)acrylate (all isomers), octyl (meth)acrylate (all isomers), 2-ethylhexyl (meth)acrylate, isopropyl (meth)acrylate and n-propyl (meth)acrylate. Preferred monomers of formula $CH_2=CR^1-COOR^2$ include butyl (meth)acrylate (all isomers), methyl (meth)acrylate, octyl (meth)acrylate (all isomers) and ethyl (meth)acrylate.

The vinyl monomers may include vinyl monomers carrying functional groups such as crosslinker groups and/or water-dispersing groups. Such functionality may be introduced directly in the vinyl polymer by free-radical polymerisation, or alternatively the functional group may be introduced by a reaction of a reactive vinyl monomer, which is subsequently reacted with a reactive compound carrying the desired functional group.

Vinyl monomers providing ionic or potentially ionic water-dispersing groups include but are not limited to (meth)acrylic acid, itaconic acid, maleic acid, citraconic acid and styrenesulphonic acid. Preferably such vinyl monomers are not added until preparation of the isocyanate-terminated prepolymer is complete as they may react with the prepolymer components.

Preferably the level of vinyl monomers providing ionic or potentially ionic water-dispersing groups is between 0 and 5 wt %, more preferably between 0 and 1 wt % and most preferably 0 wt % of the total level of vinyl monomers used.

Preferably the resultant vinyl polymer has an acid value in the range of from 0 to 20, more preferably 0 to 10 and especially 0 mgKOH/g.

Vinyl monomers providing non-ionic water-dispersing groups include alkoxy polyethylene glycol (meth)acrylates, preferably having a number average molecular weight of from 350 to 3000. Examples of such monomers which are commercially available include ω-methoxypolyethylene glycol (meth)acrylates.

Examples of suitable vinyl monomers providing crosslinking groups include acrylic and methacrylic monomers having at least one free carboxyl, hydroxyl, epoxy, acetoacetoxy or keto group, such as acrylic acid and methacrylic acid, glycidyl acrylate, glycidyl methacrylate, aceto acetoxy ethyl methacrylate, diacetone acrylamide, allyl methacrylate, tetraethylene glycol dimethacrylate and divinyl benzene.

If any vinyl monomer is added before dispersion of the prepolymer, then preferably the vinyl monomer added pre dispersion comprises 40 to 100 wt % of vinyl monomer selected from the group consisting of methyl (methyl)acrylate and ethyl (meth)acrylate.

If any vinyl monomer is added before dispersion of the prepolymer, then preferably the vinyl monomer added pre dispersion comprises ≦45 wt %, more preferably ≦40 wt % of styrene and styrene based vinyl monomers (such as α-methyl styrene).

Preferably the weight average molecular weight (Mw) of the resultant vinyl polymer is at least 60,000 Daltons, more preferably in the range of from 100,000 to 3,000,000 Daltons and most preferably in the range of from 150,000 to 2,500,000 Daltons.

The Tg of a polymer herein stands for the glass transition temperature and is well known to be the temperature at which a polymer changes from a glassy, brittle state to a rubbery state. Tg values of polymers may be determined experimentally using techniques such as Differential Scanning Calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/Tg=W_1/Tg_1+W_2/TG_2+\ldots W_n/Tg_n$".

The calculated Tg in Kelvin may be readily converted to ° C.

The calculated Tg of the resultant vinyl polymer is preferably in the range of from 5 to 120° C. and more preferably in the range of from 30 to 110° C. If the resultant vinyl polymer comprises more than one stage then preferably the Tg is the calculated Tg of the average resultant vinyl polymer and is in the range of from −20 to 120° C., more preferably in the range of from 5 to 120° C. and most preferably 30 to 110° C.

The weight average particle size, assuming a substantially spherical particle shape, of the particles in the polyurethane or polyurethane vinyl hybrid dispersion is preferably less than 500 nm, more preferably in the range of from 20 to 300 nm and most preferably in the range of from 20 to 200 nm. More preferably at least 60 wt %, more preferably at least 75 wt % and most preferably at least 85 wt % of the particles have a particle size less than 500 nm. An disadvantage of a particle size greater than 500 nm is that the sediment content may be increased resulting in unacceptable processing.

The polymerisation of the vinyl monomers may be carried out as a batch, step-wise, gradient or as a semi-continuous polymerisation process to make a single or a multistage polymer.

Free-radical polymerisation of vinyl monomers will require the use of a free-radical-yielding initiator to initiate the vinyl polymerisation. Suitable free-radical-yielding initiators include K, Na or ammonium persulphate; hydrogen peroxide; percarbonates; organic peroxides, such as acyl peroxides including benzoyl peroxide, alkyl hydroperoxides such as t-butyl hydroperoxide (tBHPO) and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Metal compounds such as Fe.EDTA (EDTA is ethylene diamine tetracetic acid) may also be usefully employed as part of the redox initiator system. Azo functional initiators may also be used. Preferred azo initiators include azobis(isobutyronitrile) and 4,4'-azobis(4-cyanovaleric acid). The amount of initiator or initiator system used is conventional, e.g. within the range 0.05 to 6 wt % based on the total weight of vinyl monomers used. Preferred initiators include azobis(isobutyronitrile) and/or 4,4'-azobis(4-cyanovaleric acid) and especially redox couples that are active between 30° C. and 75° C. Most preferred initiators are redox couples that are active between 30° C. and 75° C. such as tBHPO and isoascorbic acid.

Molecular weight control may be provided by catalytic chain transfer agents or may be provided by using chain transfer agents such as mercaptans and halogenated hydrocarbons, for example mercaptans such as n-dodecylmercaptan, n-octylmercaptan, t-dodecylmercaptan, mercaptoethanol, iso-octyl thioglycolate, $C_2$ to $C_8$ mercapto carboxylic acids and esters thereof; and halogenated hydrocarbons such as carbon tetrabromide and bromotrichloromethane.

Combinations of conventional chain transfer agents and catalytic chain transfer agents may also be used.

Surfactants can be utilised in order to assist in the dispersion of the polyurethane and/or vinyl polymer in water (even if they are self-dispersible). Suitable surfactants include but are not limited to conventional anionic, cationic and/or non-ionic surfactants and mixtures thereof. Anionic and/or non-ionic surfactants are preferred. The amount of surfactant used is preferably 0 to 6% by weight, more preferably 0 to 3% by weight, and especially 0.1 to 2% by weight based on the weight of the solids in the aqueous composition of the invention.

In a third embodiment of the present invention there is provided a process for making an aqueous composition with a sediment content ≦5%, comprising a polyurethane dispersion and containing ≦5 wt % of 1-methyl-2-pyrrolidinone by weight of the polyurethane, wherein the polyurethane has an acid value in the range of from 24 to 65 mgKOH/g and where the process is carried out in steps comprising:
I: reacting in the presence of (a) ≦5 wt % of 1-methyl-2-pyrrolidinone by weight of polyurethane and (b) 5 to 100 wt % of 1-ethyl-2-pyrrolidinone by weight of polyurethane;
(i) 30 to 60 wt % of at least one aromatic polyisocyanate;
(ii) 0 to 30 wt % of at least one aliphatic polyisocyanate;
(iii) 0 to 15 wt % of at least one isocyanate-reactive polyol bearing ionic and/or potentially ionic water-dispersing groups with a weight average molecular weight ≦500 g/mol;
(iv) 0 to 10 wt % of at least one isocyanate-reactive polyol bearing non-ionic water-dispersing groups;
(v) 0 to 15 wt % of at least one isocyanate-reactive polyol with a weight average molecular weight ≦500 g/mol not comprised by (iii) or (iv);
(vi) 20 to 58 wt % of at least one isocyanate-reactive polyol not comprised by (iii), (iv) or (v);
where (i)+(ii)+(iii)+(iv)+(v)+(vi) add up to 100 wt %;
where the NCO/OH ratio is in the range of from 1.2:1 to 2.5:1 to form an isocyanate-terminated prepolymer;
II: neutralizing the isocyanate-terminated prepolymer with a neutralizing agent;
III: forming an aqueous dispersion of the isocyanate-terminated prepolymer in water; and
IV: reacting the isocyanate-terminated prepolymer with at least one active hydrogen chain-extending compound to form the polyurethane; where the active hydrogen/NCO ratio is in the range of from 0.4:1 to 1.3:1;

It is also possible to put a part of the NEP in the water before dispersing the isocyanate-terminated prepolymer therein. Preferably ≧50 wt %, more preferably ≧70 wt % and most preferably all of the NEP used is present in the isocyanate-terminated prepolymer before dispersion in the water.

In a fourth embodiment of the present invention there is provided a process for making an aqueous composition with a sediment content ≦5%, comprising a polyurethane vinyl hybrid dispersion and containing ≦0.5 wt % of 1-methyl-2-pyrrolidinone by weight of the composition, wherein the polyurethane has an acid value in the range of from 24 to 65 mgKOH/g, and where the process is carried out in steps comprising:
I: reacting in the presence of (a) ≦5 wt % of 1-methyl-2-pyrrolidinone by weight of polyurethane and (b) 5 to 100 wt % of 1-ethyl-2-pyrrolidinone by weight of polyurethane;
(i) 30 to 60 wt % of at least one aromatic polyisocyanate;
(ii) 0 to 30 wt % of at least one aliphatic polyisocyanate;
(iii) 0 to 15 wt % of at least one isocyanate-reactive polyol bearing ionic and/or potentially ionic water-dispersing groups with a weight average molecular weight ≦500 g/mol;
(iv) 0 to 10 wt % of at least one isocyanate-reactive polyol bearing non-ionic water-dispersing groups;
(v) 0 to 15 wt % of at least one isocyanate-reactive polyol with a weight average molecular weight ≦500 g/mol not comprised by (iii) or (iv);
(vi) 20 to 58 wt % of at least one isocyanate-reactive polyol not comprised by (iii), (iv) or (v);
where (i)+(ii)+(iii)+(iv)+(v)+(vi) add up to 100 wt %;
where the NCO/OH ratio is in the range of from 1.2:1 to 2.5:1 to form an isocyanate-terminated prepolymer;
II: neutralizing the isocyanate-terminated prepolymer with a neutralizing agent;
III: forming an aqueous dispersion of the isocyanate-terminated prepolymer in water;
IV: reacting the isocyanate-terminated prepolymer with at least one active hydrogen chain-extending compound to form the polyurethane;
where the active hydrogen/NCO ratio is in the range of from 0.4:1 to 1.3:1;
V: adding vinyl monomer; and
VI: polymerising the vinyl monomer added in step V.

The process steps may be carried out in a number of variations.

For example step II may be carried out simultaneously with or before step III. Preferably step II is not carried out after step III or step IV. Preferably step III is not carried out after Step IV. Preferably Step VI is not carried out before Step III. Step VI is preferably carried out after Step IV. Step II may be carried out simultaneously with step III and the neutralizing agent is substantially present in the water. Preferably Steps II, III and IV are carried out simultaneously followed by Step V and VI. Steps V may be carried out before and/or during and/or after Step I, followed by Steps II, III and IV which may be carried out simultaneously, followed by step VI. Optionally at least a part of the vinyl monomers added in Step V are added to the isocyanate-terminated prepolymer before step II. Preferably 5 to 30 wt % of vinyl monomer (by weight of isocyanate-terminated prepolymer) are added before step II. Step II, Step III and/or Step IV may be carried out by means of one or more in-line mixers. If an in-line mixer is used, preferably at least step II is carried out by means of an in-line mixer. The time between step III and step IV is preferably less than 40 minutes, more preferably less than 15 minutes, especially less than 5 minutes and most preferably Steps III and IV are carried out simultaneously. Preferably at least 50 wt % of the active-hydrogen chain extending compound is present in the water before completion of step III. Step VI may be carried out by means of a batch polymerisation process.

Optionally the isocyanate-terminated prepolymer may be dispersed in a preformed polymer dispersion, including vinyl polymer, polyurethane, alkyd or polyurethane vinyl polymer hybrid dispersions or mixtures thereof.

The aqueous composition of the invention typically has a solids content of from about 20 to 55% by weight, more usually from 25 to 45% by weight and especially from 29 to 39 wt %.

The aqueous composition of the invention is particularly useful for providing the principle component of coating compositions (e.g. protective or decorative coating compositions) especially for coating composition for floors for which purpose it may be further diluted with water and/or organic solvents, or it may be supplied in a more concentrated form by evaporation of water and/or organic components of the liquid medium. As a coating composition, it may be applied to a variety of substrates including wood (in particular porous wood), board, metals, stone, concrete, glass, cloth, leather, paper plastics, foam and the like, by any conventional method including brushing, dipping, flow coating, spraying and the like. The aqueous composition once applied may be allowed to dry naturally at ambient temperature or the drying process may be accelerated by the application of heat.

The aqueous composition of the invention may contain conventional ingredients, some of which have been mentioned above; examples include pigments (for example titanium dioxide, iron oxide, chromium based compounds and/or metal phthalocyanine compounds), dyes, emulsifiers, surfactants, plasticizers, thickeners, heat stabilisers, matting agents such as silica, levelling agents, anti-cratering agents, fillers, sedimentation inhibitors, UV absorbers, antioxidants, drier salts, water-soluble and/or water-insoluble co-solvents, wetting agents, defoamers, fungicides, bactericides, waxes and the like introduced at any stage of the production process or subsequently. It is possible to include an amount of antimony oxide in the dispersions to enhance the fire retardant properties.

The aqueous composition of the invention preferably contains less than 17 wt % of organic co-solvents and more preferably less than 12 wt % based on the weight of the composition. As part of the organic co-solvents an organic co-solvent Q may be added. Organic co-solvent Q can be added in amounts of 0 to 10 wt %, more preferably 0 to 8 wt % and most preferably 1 to 5 wt % based on polymer solids. Organic co-solvent Q may optionally be added at any stage of the isocyanate-terminated prepolymer or polyurethane vinyl hybrid preparation to control the viscosity.

Organic co-solvent Q has an evaporation rate from 0.001 to 0.1, more preferably from 0.002 to 0.05 and most preferably from 0.002 to 0.02, relative to butyl acetate with an evaporation rate of 1.0.

Preferably the organic co-solvent Q is selected from the group consisting of oxygen containing co-solvents. Especially preferred are ethyldiglycol, butylglycyl, butyldiglycol, Dowanol DPnB, and Dowanol DPM (Dowanol is a trade mark of Dow).

If desired the aqueous polyurethane dispersion or polyurethane vinyl hybrid dispersion of the invention can be used in combination with other polymer compositions which are not according to the invention. For example the aqueous polyurethane dispersion may be combined with a prepared vinyl polymer dispersion and then preferably the ratio of polyurethane to vinyl polymer is the range of from 95:5 to 30:70, more preferably 85:15 to 35:65 and most preferably 75:25 to 40:60.

König Hardness as used herein is a standard measure of hardness, being a determination of how the viscoelastic properties of a film formed from the dispersion slows down a swinging motion deforming the surface of the film and is measured according to DIN 53157 using an Erichsen hardness equipment.

Preferably the aqueous composition of the invention when in the form of a film has a König Hardness $\geq 70$ s, more preferably $\geq 110$ s and most preferably $\geq 150$ s.

Elongation at break as used herein is a measure of the elongation at break of an unsupported film (i.e. not on a substrate) and is measured using an Instron tensile device and is defined as the maximum elongation until break under a constant strain rate.

Preferably the aqueous composition of the invention when in the form of a film has an elongation at break $\geq 50\%$ and a König Hardness $\geq 75$ s.

The sediment content is determined after preparation of the polyurethane composition but before any filtration is carried out.

The aqueous composition of the invention preferably has a sediment content of $\leq 2.5\%$, more preferably $\leq 1\%$, more preferably $\leq 0.5\%$ and especially $\leq 0.35\%$.

It is also well known that polyurethanes based substantially on aromatic isocyanates have a tendency to yellow over time. Surprisingly we have found that polyurethane dispersion of the invention demonstrated a significant reduction in yellowing when compared to a similar aromatic polyurethane with high levels of NMP. The yellowness may be determined by measuring the colour co-ordinates of a film of a composition using a Dr Lange Spectro-pen (type LMG161), and 'b' is a measure of yellowness (+b) or blueness (−b). The coordinates approach zero for neutral colours such as white, grey or black. The higher the values are, the more saturated a colour is.

The change in yellowness of the resultant film, i.e. the yellowing $\Delta b$, was determined by measuring (w) the yellowness of the substrate before UV exposure, (x) the yellowness of the film coated in the substrate before UV exposure, (y) the yellowness of the substrate after UV exposure and (z) the yellowness of the film coated on the substrate after UV exposure. Yellowing ($\Delta b$) is defined as $((z)-(y))-((x)-(w))$.

Preferably the value of $\Delta b$ for the composition of the invention is $\leq 2.5$ and more preferably $\leq 2.1$.

In a fifth embodiment of the present invention is provided a method for coating a substrate with an aqueous composition as described herein comprising applying the aqueous composition to a substrate.

In a sixth embodiment of the present invention there is provided a substrate, preferably selected from the group consisting of wood, metal, concrete, plastic and glass, more preferably a floor coated with an aqueous composition as described herein.

The present invention is now illustrated but in no way limited by reference to the following examples. Unless otherwise specified all parts, percentages and ratios are on a weight basis.

| Components and abbreviations used: | |
|---|---|
| MDI = | Isomer mixture of 4,4'-diphenylmethane diisocyanate and 2,4'-diphenylmethane diisocyanate available from Huntsman |
| TDI = | Toluene diisocyanate, usually as an isomer mixture of 2,4-toluene diisocyanate and 2,6-toluene diisocyanate available from Huntsman |
| Rubinate 9279 = | Blend of 41 wt % toluene diisocyanate and 59 wt % diphenylmethane diisocyanate |
| IPDI = | Isophorone diisocyanate available from Bayer |
| NEP = | 1-ethyl-2-pyrrolidinone available from BASF |
| DMPA = | Dimethylolpropionic acid available from Perstorp polyols |
| CHDM = | 1,4-Cyclohexanedimethanol available from Eastman Chemical bv |
| NPG = | Neopentyl glycol available from Aldrich |
| MPEG 750 = | methoxy polyethylene glycol 750 available from BASF, OH-number = 74.9 mgKOH/g |
| DEA = | Diethanolamine available from Cladic Nederland bv |
| PPG1000 = | Poly propylene glycol 1000, OH-number = 110.5 mg KOH/g available from Dow Benelux |
| Terathane 1000 = | Polytetramethylene ether glycol, OH-number = 112.5 mg KOH/g available from Du Pont de Nemours |
| Priplast 3192 = | Polyester diol, OH-number = 56.0 mg KOH/g available from Uniqema Chemie bv |
| DMEA = | N,N-Dimethylethanolamine available from Chemproha bv |
| EDA = | Ethylene diamine available from Delamine bv |
| Hydrazine = | Hydrazine hydrate available from Bayer AG |
| Abex2515 = | Non-ionic surfactant available from Rhodia |
| Disponyl AFX4060 = | Nonionic surfactant available from Cognis |
| Disponyl AFX4030 = | Nonionic surfactant available from Cognis |
| MMA = | Methyl methacrylate available from ECEM European Chemical Marketing bv |
| STY = | Styrene available from Dow Benelux nv |
| BMA = | n-Butyl methacrylate available from Arkema Nederland bv |
| n-BA = | n-Butyl acrylate available from BASF UK ltd |
| 2-EHA = | 2-Ethylhexyl acrylate available from Dow Benelux nv |
| IAA = | Isoascorbic acid available from Brenntag Volkers Benelux bv |
| tBHPO = | tert-Butyl hydroperoxide, available from Akzo Nobel Chemicals bv |
| FeEDTA = | Iron-ethylenediaminetetracetic acid complex, 1% in water |
| Ionol op = | 2,6-Di-tert-butyl-4-methylphenol available from Avecia Inc |
| NCO = | isocyanate group |
| UV = | ultra violet |
| MFFT = | minimum film forming temperature |

EXAMPLE I

Preparation of a Polyurethane Dispersion

A 2000 cm$^3$ flask equipped with a thermometer and overhead stirrer was charged with Rubinate 9279 (388.1 g). Then a mixture containing Terathane 1000 (230.7 g), CHDM (56.3 g), DMPA (75.0 g) and NEP (250.0 g) was added over a period of 30 minutes. The reaction was allowed to exotherm to 60° C. After the exotherm was complete the reaction was kept at 65° C. for 90 minutes. The NCO content of the resultant isocyanate-terminated prepolymer was 5.27% (theoretical 5.46%).

A dispersion of the resultant isocyanate-terminated prepolymer was made by feeding 800 g of the isocyanate-terminated prepolymer in 1 hour to deionized water (1554.8 g) containing DMEA/41.9 g), Abex2515 (36.0 g) and 15% hydrazine (100.4 g).

The isocyanate-terminated prepolymer temperature during the dispersion was kept at 50° C. and the dispersion temperature was controlled between 25 to 35° C.

The specifications of the resultant dispersion are listed in Table 1 below.

EXAMPLE II

Preparation of a Polyurethane Vinyl (50/50) Hybrid Dispersion

To 400 g of the polyurethane dispersion prepared as described in Example I was added deionised water (63.5 g), MMA (30.0 g), n-BA (19.0 g) and STY (51.0 g). After the addition of these monomers the dispersion was stirred for 1 hour at ambient temperature. To this dispersion was then added a 10% tBHPO solution in water (4.0 g) and a 1% FeEDTA solution in water (1.0 g) followed by feeding a 1% IAA solution in water (40.0 g) over 45 minutes.

The resultant polymer dispersion was filtered through 75 micron filtercloths and specifications of the resultant dispersion are listed in Table 1 below.

EXAMPLE III

Preparation of a Polyurethane Dispersion

A 2000 cm$^3$ flask equipped with a thermometer and overhead stirrer was charged with Rubinate 9279 (347.6 g). Then a mixture containing Terathane1000 (297.4 g), CHDM (45.0 g), DMPA (60.0 g) and NEP (250.0) was added over a period of 45 minutes. The reaction was allowed to exotherm to 65° C. After the exotherm was complete the reaction was kept at 65° C. for 90 minutes. The NCO content of the resultant isocyanate-terminated prepolymer was 4.75% (theoretical 4.89%).

A dispersion of the resultant isocyanate-terminated prepolymer was made by feeding 800 g of the isocyanate-terminated prepolymer in 1 hour to deionised water (1567.6 g) containing DMEA (33.5 g), Abex2515 (36.0) and 15.2% hydrazine (90.5 g).

The isocyanate-terminated prepolymer temperature during the dispersion was kept at 50° C. and the dispersion temperature was controlled between 25 to 35° C.

The specifications of the resultant dispersion are listed in Table 1 below.

EXAMPLE IV

Preparation of a Polyurethane Vinyl (50/50) Hybrid Dispersion

To 400 g of the polyurethane dispersion prepared as described in Example I was added deionised water (63.5 g), MMA (30.0 g), nBA (19.0 g) and STY (51.0 g). After the addition of these monomers the dispersion was stirred for 1 hour at ambient temperature. To this dispersion was then added a 10% tBHPO solution in water (4.0 g) and a 1% FeEDTA solution in water (1.0 g) followed by feeding a 1% IAA solution in water (40.0 g) over 45 minutes.

The resultant polymer dispersion was filtered through 75 micron filtercloths. The specifications of the resultant dispersion are listed in Table 1 below.

EXAMPLE V

Preparation of a Polyurethane Vinyl (43/57) Hybrid

Stage 1

To 1459.5 g of MPEG 750 ($M_w$=740 g/mole), 2,4-TDI (343.8 g) was added over a 90 minute period at 40-45° C. At the end of the reaction, the isocyanate content was 4.60%. The system was cooled to 25° C. and DEA (196.7 g) was added. The nonionic diol had an OH number of 103 mg KOH/g.

Stage 2

A 2000 cm³ flask equipped with a thermometer and overhead stirrer was charged with Rubinate 9279 (361.2 g) and IPDI (90.3 g). Then a mixture containing Terathane1000 (476.7 g), CHDM (55.3 g), DMPA (66.3 g), non-ionic diol from stage 1 (55.3 g) and NEP (368.3 g) was added over a period of 45 minutes. The reaction was allowed to exotherm to 70° C. After the exotherm was complete the reaction was kept at 65° C. for 90 minutes. The NCO content of the resultant isocyanate-terminated prepolymer was 3.67% (theoretical 4.01%).

A dispersion of the resultant isocyanate-terminated prepolymer was made by feeding 250 g of the isocyanate-terminated prepolymer in 1 hour to deionised water (914.9 g) containing MMA (150.0 g), BMA (100.0 g), DMEA (6.9 g), Disponyl AFX4030 (18.8) and 15.2% hydrazine (20.7 g). After dispersing a 10% tBHPO solution in water (6.5 g) and a 1% FeEDTA solution in water (3.3 g) was added followed by feeding a 2.5% IAA solution in water (20.0 g) over 45 minutes.

The isocyanate-terminated prepolymer temperature during the dispersion was kept at 50° C. and the dispersion temperature was controlled between 25 to 35° C.

The specifications of the resultant dispersion are listed in Table 1 below.

EXAMPLE VI

Preparation of a Polyurethane Dispersion

A dispersion of the isocyanate-terminated prepolymer described in example V was made by feeding 600.0 g of the isocyanate-terminated prepolymer in 1 hour to deionised water (857.6 g) containing DMEA (16.4 g), Disponyl AFX 4030 (45.0) and 15.2% hydrazine (49.7 g).

The isocyanate-terminated prepolymer temperature during the dispersion was kept at 50° C. and the dispersion temperature was controlled between 25 to 35° C.

The specifications of the resultant dispersion are listed in Table 1 below.

EXAMPLE VII

Preparation of a Polyurethane Vinyl (50/50) Hybrid Dispersion

To 300.0 g of the polyurethane dispersion prepared as described in Example VI was added deionised water (146.0 g), MMA (60.0 g) and BMA (30.0 g). After the addition of these monomers the dispersion was stirred for 1 hour at ambient temperature. To this dispersion was then added a 10% tBHPO solution in water (2.3 g) and a 1% FeEDTA solution in water (1.2 g) followed by feeding a 2.5% IAA solution in water (7.2 g) over 45 minutes.

The resultant polymer dispersion was filtered through 75 micron filtercloths. The specifications of the resultant dispersion are listed in Table 1 below.

EXAMPLE VIII

Preparation of a Polyurethane Dispersion

A 2000 cm³ flask equipped with a thermometer and overhead stirrer was charged with TDI (421.3 g). Then a mixture containing Priplast 3192 (518.0 g), NPG (55.3 g), DMPA (110.5 g) and NEP (368.3) was added over a period of 45 minutes. The reaction was allowed to exotherm to 65° C. After the exotherm was complete the reaction was kept at 65° C. for 90 minutes. The NCO content of the resultant isocyanate-terminated prepolymer was 4.44% (theoretical 4.60%).

A dispersion of the resultant isocyanate-terminated prepolymer was made by feeding 60 g of the isocyanate-terminated prepolymer in 1 hour to deionised water (862.0 g) containing DMEA (32.9 g), Disponyl AFX4060 (22.5) and 15% hydrazine (54.8 g).

The isocyanate-terminated prepolymer temperature during the dispersion was kept at 50° C. and the dispersion temperature was controlled between 25 to 35° C.

The specifications of the resultant dispersion are listed in Table 1 below.

EXAMPLE IX

Preparation of a Polyurethane Vinyl (70/30) Hybrid Dispersion

To 400.0 g of the polyurethane dispersion prepared as described in Example VIII was added deionised water (63.8 g), MMA (32.0 g) and STY (20.0 g). After the addition of these monomers the dispersion was stirred for 1 hour at ambient temperature. To this dispersion was then added a 10% tBHPO solution in water (1.4 g) and a 1% FeEDTA solution in water (0.7 g) followed by feeding a 2.5% IAA solution in water (4.2 g) over 45 minutes.

The resultant polymer dispersion was filtered through 75 micron filtercloths. The specifications of the resultant dispersion are listed in Table 1 below.

EXAMPLE X

Preparation of a Polyurethane Vinyl (45/55) Hybrid Dispersion

To 240.0 g of the polyurethane dispersion prepared as described in Example VIII was added deionised water (188.4 g), MMA (72.0 g) and n-BA (16.0 g). After the addition of these monomers the dispersion was stirred for 1 hour at ambient temperature. To this dispersion was then added a 10% tBHPO solution in water (2.3 g) and a 1% FeEDTA solution in water (1.1 g) followed by feeding a 2.5% IAA solution in water (7.0 g) over 45 minutes.

The resultant polymer dispersion was filtered through 75 micron filtercloths. The specifications of the resultant dispersion are listed in Table 1 below.

Sediment Determination

Sediment is unstabilised solid material (in the order of microns rather than nanometers) which is formed during dispersing or reaction and which will settle or precipitate upon storage and/or heating. It may be determined quantitatively by centrifuging. The sediment content was determined by taking 50 cm³ of the resultant dispersion of the examples prepared above, diluting this with water (1:1) and centrifuging the diluted composition for 15 minutes at 1500 rpm (276G) rpm in a centrifuge tube.

Each division on the tube tip represents 0.05 cm³ or 0.05% sediment. The outcome, i.e. the level of solid sediment in the tube tip was then multiplied by 2 to take into account the dilution factor.

TABLE 1

|  | Example | | | | | | | | | |
|---|---|---|---|---|---|---|---|---|---|---|
|  | I | II | III | IV | V | VI | VII | VIII | IX | X |
| Solids [%] | 25.6 | 34.1 | 25.5 | 33.6 | 29.8 | 28.8 | 27.5 | 30.5 | 42.2 | 33.5 |
| pH | 7.9 | 8.3 | 7.9 | 8.3 | 7.4 | 7.5 | 7.6 | 7.5 | 8.4 | 8.0 |
| Viscosity [mPa · s] * | 50 | 156 | 50 | 121 | 50 | 500 | 840 | 250 | 11360 | 1460 |
| Sediment [%] # | 0.3 | 0.4 | 0.3 | 0.3 | 0.2 | 0.2 | <0.05 | 0.2 | 0.10 | 0.15 |
| Absorbance ** | <5 | 30 | <5 | 74 | 100 | <5 | 5 | 14 | 28 | 74 |
| Particle size [nm] | 24 | 131 | 28 | 142 | 64 | 57 | 46 | 142 | 264 | 268 |
| MFFT [° C.] | <5 | <5 | <5 | <5 | <5 | <5 | <5 | <5 | <5 | <5 |
| KH [s] *** | 193 | 209 | 158 | 195 | 153 | 75 | 167 | 115 | 171 | 166 |
| Elongation at break [%] | 163 | 125 | 197 | 184 | 134 | 236 | 175 | 215 | 107 | 58 |
| Yellowness ## | 1.2/3.1 | 0.4/2.3 | 1.6/3.4 | 0.6/2.5 | 0.0/2.0 | 0.2/2.0 | 0.1/1.9 | 0.4/2.3 | 0.2/1.8 | 0.5/2.4 |
| Yellowing Δb | 0.9 | 1.9 | 1.8 | 1.9 | 2.0 | 1.8 | 1.8 | 1.9 | 1.6 | 1.9 |

* A Brookfield viscosity at 25° C.
** The measured absorbance by spectrometry at 650 nm using a path length of 1 mm.
*** The König Hardness (KH) of a dried film cast on a glass plate with a wet film thickness of 80 micron.
The sediment was determined before filtration.
The yellowness of the dried film before UV exposure/after UV exposure where the UV exposure was 10 × 400 mJ/cm².

The invention claimed is:

1. An aqueous composition comprising a polyurethane vinyl hybrid dispersion and ≦0.5 wt % of 1-methyl-2-pyrrolidinone by weight of the composition, wherein the polyurethane has an acid value in the range of from to 24 to 65 mgKOH/g and is the reaction product of:
   A) an isocyanate-terminated prepolymer formed from components comprising:
      (i) 36 to 60 wt % of at least one aromatic polyisocyanate;
      (ii) 0 to 30 wt % of at least one aliphatic polyisocyanate;
      (iii) 0 to 15 wt % of at least one isocyanate-reactive polyol bearing ionic and/or potentially ionic water-dispersing groups with a weight average molecular weight ≦500 g/mol;
      (iv) 0 to 10 wt % of at least one isocyanate-reactive polyol bearing non-ionic water-dispersing groups;
      (v) 0 to 15 wt % of at least one isocyanate-reactive polyol with a weight average molecular weight ≦500 g/mol not comprised by (iii) or (iv);
      (vi) 20 to 58 wt % of at least one isocyanate-reactive polyol not comprised by (iii), (iv) or (v);
      where (i)+(ii)+(iii)+(iv)+(v)+(vi) add up to 100 wt %; and
      where the NCO/OH ratio is from 1.2 to 2.5; and
   B) at least one active-hydrogen chain extending compound;
   in the presence of (a) ≦5 wt % of 1-methyl-2-pyrrolidinone by weight of polyurethane, (b) 5 to 100 wt % of 1-ethyl-2-pyrrolidinone by weight of polyurethane and (c) water.

2. An aqueous composition according to claim 1, wherein the ratio of polyurethane to vinyl polymer in the polyurethane vinyl hybrid is in the range of from 95:5 to 30:70.

3. An aqueous composition according to claim 1, wherein the calculated Tg of the vinyl polymer in the polyurethane vinyl hybrid is in the range of from 20 to 120° C.

4. An aqueous composition according to claim 1, where the polyurethane vinyl hybrid is obtained by the polymerisation of vinyl monomers in the presence of the polyurethane.

5. An aqueous composition according to claim 1, wherein at least 20 to 80 wt % of component (i) consists of methylenebis(phenyl isocyanate).

6. An aqueous composition according to claim 1, where components (i)+(ii)+(iii)+(V) add up to ≧42 wt %.

7. An aqueous composition according to claim 1, wherein the ionic water-dispersing groups in the isocyanate-terminated prepolymer are neutralised with a neutralising agent in the range of from 0.5:1 to 1.4:1.

8. An aqueous composition according to claim 1, wherein ≧60 wt % of the carboxylic acid groups in the isocyanate-terminated prepolymer are neutralised with an oxygen containing amine.

9. An aqueous composition according to claim 8, wherein the oxygen containing amine is selected from the group consisting of N-ethyl morpholine; N-methyl morpholine; and $R^1(R^2)NR^3OH$ with a Mn in the range of from 88 to 118, where $R_1$, $R_2$ and $R_3$ are independently $C_1$ to $C_4$ alkyl.

10. An aqueous composition according to claim 1, which when in the form of film has a König Hardness ≧75 s.

11. An aqueous composition according to claim 1, which when in the form of a film has an elongation at break ≧50% and a König Hardness ≧75 s.

12. An aqueous composition according to claim 1, with a solids content in the range of from 20 to 55 wt %.

13. An aqueous composition according to claim 1, with a weight average particle size less than 500 nm.

14. A coating obtained from an aqueous composition according to claim 1.

15. A method of coating a substrate using an aqueous composition according to claim 1 comprising applying the aqueous composition to a substrate.

16. A substrate having a coating of an aqueous composition according to claim 1.

17. A substrate according to claim 16 selected from the group consisting of wood, metal, concrete, plastic and glass.

18. A floor having a coating of an aqueous composition according to claim 1.

19. A process for making an aqueous composition with a sediment content ≦5% comprising a polyurethane vinyl hybrid dispersion and containing ≦0.5 wt % of 1-methyl-2-pyrrolidinone by weight of the composition, wherein the polyurethane has an acid value in the range of from 24 to 65 mgKOH/g and wherein the process is carried out in steps comprising:
   I: reacting in the presence of (a) ≦5 wt % of 1-methyl-2-pyrrolidinone by weight of polyurethane and (b) 5 to 100 wt % of 1-ethyl-2-pyrrolidinone by weight of polyurethane:

(i) 36 to 60 wt % of at least one aromatic polyisocyanate;
(ii) 0 to 30 wt % of at least one aliphatic polyisocyanate;
(iii) 0 to 15 wt % of at least one isocyanate-reactive polyol bearing ionic and/or potentially ionic water-dispersing groups with a weight average molecular weight ≦500 g/mol;
(iv) 0 to 10 wt % of at least one isocyanate-reactive polyol bearing non-ionic water-dispersing groups;
(v) 0 to 15 wt % of at least one isocyanate-reactive polyol with a weight average molecular weight ≦500 g/mol not comprised by (iii) or (iv);
(vi) 20 to 58 wt % of at least one isocyanate-reactive polyol not comprised by (iii), (iv) or (v);
where (i)+(ii)+(iii)+(iv)+(v)+(vi) add up to 100 wt %;
where the NCO/OH ratio is from 1.2:1 to 2.5:1 to form an isocyanate-terminated prepolymer;

II: neutralising the isocyanate-terminated prepolymer with a neutralising agent;
III: forming an aqueous dispersion of the isocyanate-terminated prepolymer in water;
IV: reacting the isocyanate-terminated prepolymer with at least one active hydrogen chain-extending compound to form the polyurethane, where the active hydrogen/NCO ratio is in the range of from 0.4:1 to 1.3:1;
V: adding vinyl monomer; and
VI: polymerising the vinyl monomer added in step V.

20. A process according to claim 19, where step II is carried out by means of at least an in-line mixer.

21. A process according to claim 19 where the time between step III and step IV is less than 40 minutes.

* * * * *